3 Sheets—Sheet 1.

S. LEWIS

Assignor of one-half Interest to W. H. CAMMEYER.

PORTABLE AND CONVERTIBLE COFFER-DAMS.

No. 7,436. Reissued Dec. 19, 1876.

Attest;
David C. Haring
O. C. Carpenter

Inventor
Samuel Lewis

3 Sheets—Sheet 2.

S. LEWIS.

Assignor of one-half Interest to W. H. CAMMEYER.

PORTABLE AND CONVERTIBLE COFFER-DAMS.

No. 7,436. Reissued Dec. 19, 1876.

Attest
David C. Haring
O. C. Carpenter

Inventor
Samuel Lewis

S. LEWIS.

Assignor of one-half Interest to W. H. CAMMEYER.

PORTABLE AND CONVERTIBLE COFFER-DAMS.

No. 7,436. Reissued Dec. 19, 1876.

Attest
David C. Waring
O. C. Carpenter

Inventor
Samuel Lewis

UNITED STATES PATENT OFFICE.

SAMUEL LEWIS, OF BROOKLYN, NEW YORK, ASSIGNOR OF ONE-HALF INTEREST TO WM. H. CAMMEYER.

IMPROVEMENT IN PORTABLE AND CONVERTIBLE COFFER-DAMS.

Specification forming part of Letters Patent No. 92,324, dated July 6, 1869; reissue No. 7,436, dated December 19, 1876; application filed July 20, 1876.

*To all whom it may concern:*

Be it known that I, SAMUEL LEWIS, of the city of Brooklyn, county of Kings and State of New York, did invent a new and Improved Portable, Adjustable, and Convertible Coffer-Dam, and that the following specification, taken in connection with the drawings accompanying it, and forming a part thereof, is a full, clear, and exact description of my said invention, sufficient to enable those skilled in the art to which it appertains to construct and operate the same.

The invention relates to a new and improved construction of caissons or coffer-dams, for building piers and other submerged structures, and is adapted to other subaqueous uses, such as raising sunken vessels, &c.

The perishable and temporary character of the piers and docks along the water-fronts of our seaboard cities, has long been a matter of disparaging comparison between our own ports and those of other countries, and it is believed that one reason for this has been the absence of any means for constructing more permanent works, except at an expense entirely incommensurate with any anticipated advantages. Prior to my invention the method of building piers of stone involved the use of a distinct coffer-dam for each structure, the cost of which, in many instances, approached the cost of the pier, while, after it had once performed its functions, would be useless for the construction of another pier, except as its materials might be taken apart and rebuilt.

One purpose of my invention was to reduce this element of cost, so that, after the first outlay, the chief expense of dam-construction will be obviated, and the same structure serve for successive uses as well as different kinds of work.

The apparatus is designed as a portable means for aiding in the building of fortifications, piers, and foundations of bridges or other structures, and in general for the purpose of exposing or rendering accessible to the direct application of human energies any surface beneath the level of the water, at a reasonable depth, whether the bed of the stream or above it. It is also adapted for raising sunken ships or vessels, and also for emptying the hull of a sunken vessel of its contents, whether cargo or drift.

The feature of portability results from the construction of the dam. It is made of water-tight double walls, and the space between the same I divide into two or more chambers, the partitions to which are also water-tight, and may be made air-tight. These chambers are adapted to be filled with air or water, and to have their contents exhausted or forced out, and in one of them may be placed the machinery to accomplish this.

Figure 1 is a view of the dam in working position, extended vertically to its full depth, and with the outer covering of the lower section removed. It is provided with vertical, horizontal, and diagonal bracing and timbering, to give it strength and stability. The sections are divided into water-tight compartments, as shown by the partitions 4 4, and in the same are the apertures and pipes for admitting and forcing out the water. *r r* is a flap-packing, for the bottom of the dam, and 16 is a round packing between the two sections. The supports by which one section can rest on the other are shown at 17 17, and 8 and 9 are the weights and ropes for adjusting and keeping in place the flap-packing.

The dam is constructed of two walls of a suitable thickness, set apart in two vertical planes at such a distance as to give the desired buoyancy, and of such height and length as may be required for the particular work to be done. I contemplate constructing said side walls of plate-iron. The main walls are closed water-tight by horizontal plates or timbers at their tops, sides, and bottoms.

Figure 1:
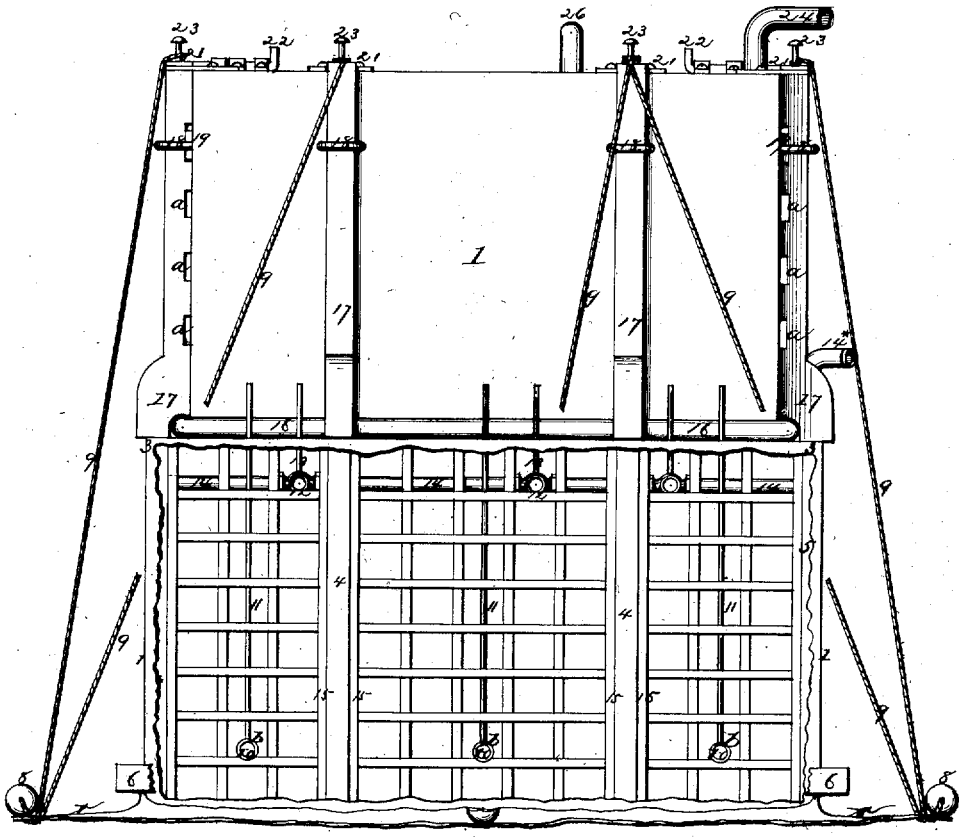

I propose to make the two sections alike in general construction, having in the upper section staples 18, which clasp the supports 17. The upper section, as shown, is sufficiently reduced in horizontal area to slide easily within the lower one. The supports 17 are stout timbers, resting on the lower section, on which the upper section is suspended by the staples 18 and the plates 19, which latter are riveted through the outer face of the section, and set into the recesses in the supports marked *a a a*, according to the height at which it is desired that the inner section shall stand. The staples 18 pass through tubes, which are expanded at their ends, and fit on the inner and outer walls made of plates in the same manner as a boiler-tube. The ends of said staples are secured by nuts 20, under each of which an appropriate packing is inserted. Each side of each section is divided into several tight compartments, as seen in the lower part of Fig. 1, and 5 5 are stout timbers, vertically on a line with the supports 17, as shown, and forming the partition between said compartments. 15 15 are the flanged edges of plates which I use for partitions, similar to 51 and 51, Fig. 2, which lie up to each upright timber from the inner to the outer walls 1 and 2, riveting through the same. The object of these compartments is to render the sections self-buoying, whatever accident may happen to any one of said compartments. Around the upper part of the inside of each section runs a tube, 14, Fig. 1, the outer ends of which may be seen at 14* and 24. These tubes are provided with cocks 12, one for each compartment. These cocks or valves are opened or closed by the rods 13 13, which are proposed to be operated from above by socket-wrenches, or in any other suitable way. 10 10 are the waste-openings, through which the water may pass as air is injected into the several spaces. These openings are furnished with valves *b b*, as shown, which valves are operated by the rods 11 11 11 in the manner just described. Attached to the bottom of the lower section is the flap-packing *r* designed to exclude the water at that point. This packing may be connected, as shown, by the surrounding timbers 6, or attached farther up, so as to allow for the sinking of the edge of the dam without dragging the flap from its rectangular direction. This flap is extended by the lines 9 9 being carried off to a proper distance as the lower section is sinking, and the weights 8 8 keep the flap extended till the ordinary ballast or sand-bag packing is let down upon it from above. The ropes 9 9 are then brought home and hitched to appropriate pins 23 in the heads of the supports or elsewhere. The flap attached to the removable side, Fig. 3, is adapted to lap over that connected with the main dam, thus compensating for the unavoidable break at two of the angles. I provide a packing, 16, to close the space between the two sections. When they are extended the weight of the external water serves to press the packing into water-tight contact with the two sections.

In Fig. 3, at 22 22, are the chucks, which retain the doors in position till the outside pressure begins to operate. These chucks pass under straps on the door and enter like straps *c c* on the main dam. At 21 21 are shown guides for holding in position the supports 17.

Figure 2:
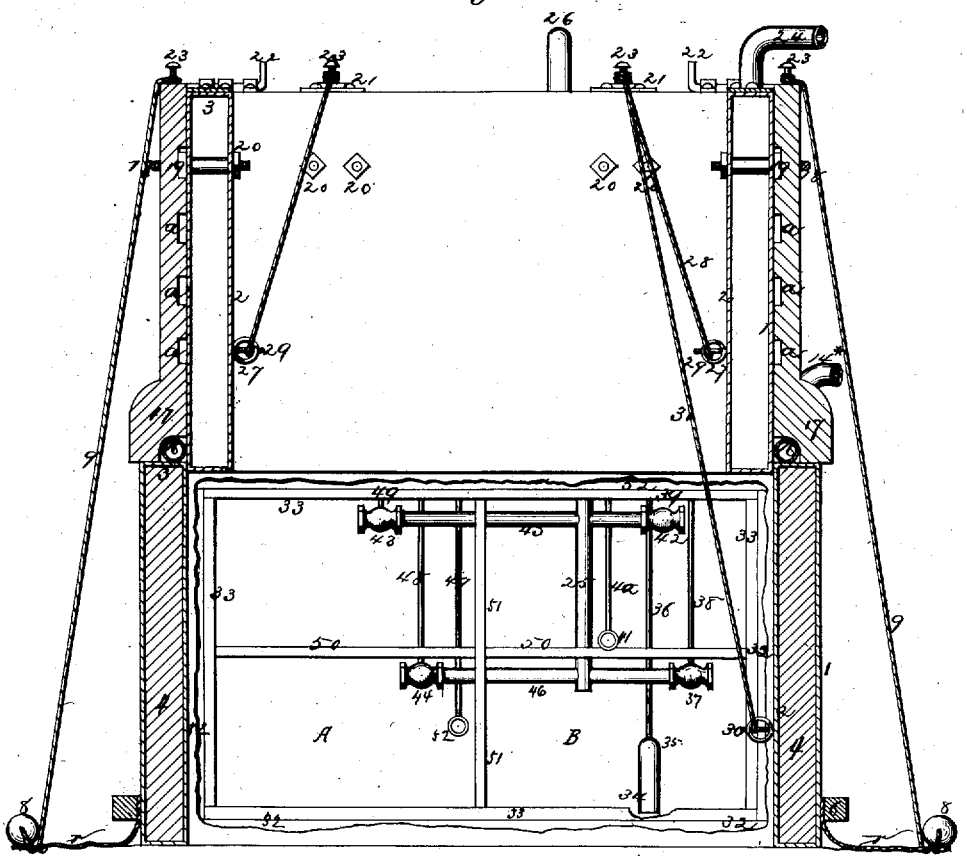
Fig. 2 is an inside view of the door or removable side, the inner face of the lower door being shown removed, in order to exhibit the compartments, and the manner of filling them with water or air, as may be desired; the attachments for drawing said doors into their places, with the manner of fastening the supports, &c.
Figure 3:
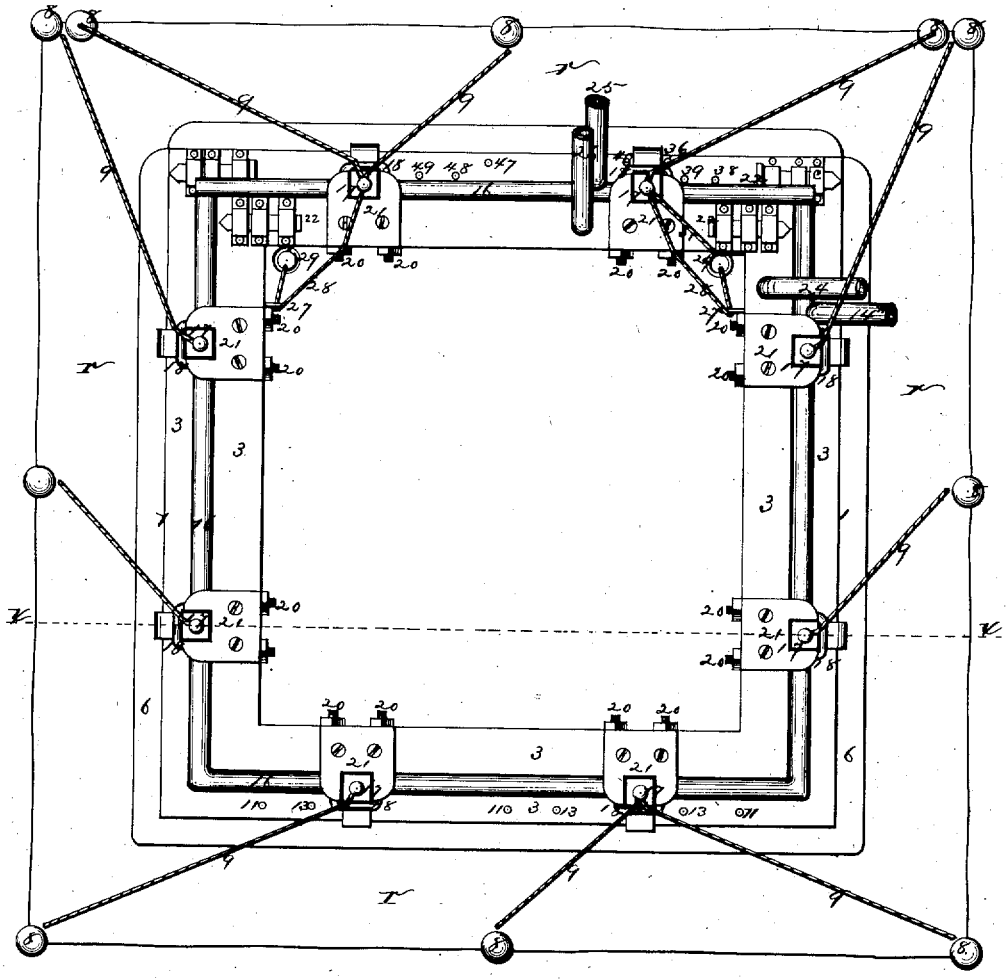
Fig. 3 is a plan or top view, showing, besides a number of parts already enumerated, the upper face of the sections, the manner of fitting and fastening the door, the upper guides for the supports, the tubes for exhausting or filling the spaces between the outer and inner walls of the sections, the timber-trimming by which the flap-packing is held in place, &c.

The removable door is shown in Fig. 2, the lower side, marked A, having its inner wall removed, in order to expose its peculiar system of compartments, cocks, and tubing, the method of filling and exhausting the compartments, the means of placing the doors in working position, and of removing the same when desirable. The view of these lines is from the dotted line *x x*, Fig. 3. 33, 50, and 51 are metallic partitions or timber bulk-heads, to divide the space into compartments, two only of which—those on the right-hand side—are shown complete. Each of these divisions is provided with a valve or cock, 37, 42, 43, and 44, operated by rods 38, 39, 48, and 49. These valves connect with the air-pumps through the pipes 45, 46, 25, and 26, the latter being the mouth of the pipe in the upper section, corresponding with 25 in the lower section. 41 is a valve, provided with its rod 40, and 35 is an elbowed tube, reaching nearly to the bottom of the compartment, and containing a valve, 34, in its horizontal length, operated by the rod 36, in the manner before described. 27 and 29 are rings or eyes, as seen in Figs. 2 and 3, the first attached to the inner side of the main dam, and the latter to the door, as shown in Fig. 2. The rope 28, fastened to the ring 29, is seen drawn through 27, and hitched onto the pin 23, as shown in Fig. 2. The opening, marked 52, in the lower left-hand square of A is for the purpose of letting in the water around the pier or other work when it is completed. This opening is placed at some distance from the bottom of the section, so as to keep the aperture above the mud, sand, or weeds. The valve in this opening is connected with its rod 47, and operated as before described.

Having thus described the construction and parts of this dam, I will now proceed to explain the manner of placing it in position and its operation.

The sections having been prepared as above, the upper section, minus the supports 17, is inclosed within the lower, and the door of the latter drawn into its place by the ropes 31, running through eyes 30, similar to 27 and 29, in the upper section, and fastened by the chucks 22, and, if necessary, by a similar locking below. The dam, with its sections thus put together, is then towed to the place where the building is to be done, and, the exact line of submersion being ascertained, the structure is fixed in the proper position by lines from the shore, anchors, or otherwise. The valves in both sections are then opened, with the exception of 52, when each lower valve admits the water into its own compartment, the air escaping through the upper valves at 14*, 24, and 26.

When both sections have received sufficient water to submerge them to the depth of the upper section, as seen in Fig. 2, the valves in that section are closed, while those in the lower section are left open until its upper edge is level with the surface of the water, when its valves are likewise closed, and the farther sinking, for the time, stopped. The supports 17 are then placed in position, and left so that they will slide freely in the staples over the plate 19. When this has been done, and the packing 16 carefully and accurately placed, the valves of the lower section are again opened, and it is allowed to sink until it lies upon the bottom of the water. While this section is sinking the ropes 9 9 are taken to a distance, so as to keep the flap-packing 7 extended, and to deposit the weights 8 8 at as great a distance from the dam as the width of the packing will allow. The ropes are then brought home and made fast to their appropriate pins, and the ballast-packing for the lower edge of the section is let down and placed in the usual way. When this has been done the supports are brought home, with their proper recess on the plate 19.

If the sinkage of the lower section has been such as to require the raising or lowering of the upper section in order to bring a recess opposite the plate, that is effected by the admission of a little more water, as before, or by the injection of a proper amount of air to give the requisite additional buoyancy. The nuts 20 are then screwed home, and the dam is ready for having its inclosed interior pumped out. The pumping is then commenced, and continued until the space inclosed by the dam is empty, when the operations preliminary to building are begun.

When the pier or other structure has reached above the high-water line, the valve 52 may be opened, and the water will rush in from the outside until the space between the pier and the dam is filled. The supports are then removed, the ballast cleared from the flap, and a pump connected with 14* and 25.

The valves of the lower section being all open and an air-pump set to work, the water is forced out of the section at 34 and 41, Fig. 2, and at 10 10 10, Fig. 1, until its upper line emerges from the water, when its valves are all reclosed, and the like treatment applied to the upper section until all the water it contained has been forced out, when it will float with its original draft. The remaining water in the lower section is then expelled, and the whole dam is in the condition in which it was floated to the work.

The detachment of the doors is effected by simply withdrawing the chucks 22 and easing the ropes 28 and 31, when the door will float away by its own buoyancy. It is desirable that the door thus leaving the dam should retain an edgewise or vertical position in the water, both for the purpose of placing it in working position, and for its removal and after handling, otherwise a large amount of pewer would be required to raise and manipulate so large a slab in the water. It is with reference to this necessity that the peculiar system of compartments, tubing, &c., of this side has been adopted. Thus, by filling or partly filling the lower compartments A and B, Fig. 2, a weight is given to the bottom which maintains the doors in just the desired position for attachment or removal.

When the doors have been thus opened or floated off, the main dam is drawn away either into a position for building another length to said pier, or to any other spot where it may be designed to use it. In the case of building additional lengths to the same pier, or a long dock or bulk-head, additional doors of suitable dimensions may be used to close the spaces between the open ends of the main dam and the finished masonry.

This apparatus can be used for raising sunken vessels and other bodies, and for that purpose its form and application may be modified. For instance, two distinct dams may be let down, so that one will be adjacent to or inclose each end of the vessel. These two can be connected by extension flats or secondary sections, which may be compartmented, tubed, and operated similarly to the larger dams or doors, as described, and extended so as to inclose the object when the whole are sunk.

The wreck or other object, having been firmly connected with the dam, will be raised by the buoyancy of the sections when exhausted, so that it can be towed along with the dam into port.

Where a vessel is sunk in shallow water and filled with drift or other matter, the dam can be used, as in the case of building a pier, in order to get at the wreck, and, by clearing it of its contents, put it in a condition in which it may be raised.

Having thus described my invention, I do not limit myself to the details of construction and operation which I have hereinbefore described as one way of embodying the principles of my invention, for it is obvious that the same valuable results can be attained by modifications of the minor items; for instance, the joints can be packed by the means already described, or in any other appropriate manner, and, although the construction and operation of a vertically-adjustable dam of more than one concentric section has been given in detail to illustrate the use of my invention in deep water, it is obvious that in shallower water, or with a dam of sufficient depth, but a single section need be used, which would render the operation much simpler.

The method of emptying the sections of their water, as above described, is adapted to the use of an air-pump for forcing the water out. It is also obvious that the water would be removed from the sections by the same pumps which empty the interior of the dam, the pumping apparatus forming no essential part of my present claims.

What I claim as my invention, and desire to secure by Letters Patent, is—

1. A coffer-dam or caisson inclosing an open well, the same being constructed with double walls and having its sides divided by partitions into two or more water-tight compartments, substantially as and for the purposes specified.

2. In a coffer-dam or caisson, the combination of two or more vertically-adjustable double-walled sections, substantially as described.

3. In combination with a portable coffer-dam or caisson, the supports 17 for a vertically-extended section, substantially as and for the purposes described.

SAMUEL LEWIS.

Witnesses:

DAVID C. WARING,

O. C. CARPENTER.